Patented May 17, 1938

2,117,772

UNITED STATES PATENT OFFICE 2,117,772

SULPHURIC ACID ESTERS OF HALOGEN-AMINOANTHRAQUINONES

Otto Stallmann, South Milwaukee, Wis., assignor to E. I. du Pont de Nemours & Company, Wilmington, Del., a corporation of Delaware No Drawing. Application August 24, 1936, Serial No. 97,647

7 Claims. (Cl. 260—99.12)

This invention relates to the preparation of leuco-sulphuric acid esters of amino-halogen-anthraquinones.

The object of the invention is to provide a method for preparing leuco-sulphuric acid esters of 2-amino-3-halogen-anthraquinones directly from 1,3-dihalogen-2-aminoanthraquinone, thereby making available for the preparation of these solubilized compounds the use of intermediates which are more readily available than the compounds heretofore employed.

It is a further object of the invention to provide a process whereby the leuco-sulphuric acid esters of 3-bromo-2-aminoanthraquinone can be readily prepared.

Heretofore in the preparation of the leuco-sulphuric acid esters of anthraquinone compounds which are later to be converted to dyestuffs of the indanthrone series by oxidation, 2-aminoanthraquinone compounds were used which contained no substituent in the 1-position. These compounds, including the 2-amino-3-chloroanthraquinone, were reacted in pyridine with sulphur trioxide, in the presence of a metal such as copper or zinc. It has also been known that compounds such as the chloroanthraquinone-2-carboxylic acid could be converted to the leuco-disulphuric acid ester. However, the chlorine in this compound was subsequently replaced by an amino group which is evidence of the fact that in that process the chlorine is not attacked during the solubilization reaction (see U. S. Patent 1,904,721).

The 2-amino-3-chloroanthraquinone heretofore used as the starting material in the preparation of the leuco-sulphuric acid esters of 2-amino-3-chloroanthraquinone is difficult to prepare, and the 2-amino-3-bromoanthraquinone cannot be satisfactorily solubilized by the procedure ordinarily used for solubilizing the 2-amino-3-chloroanthraquinone. I have found that the much more readily available 1,3-dihalogen-2-aminoanthraquinones can be converted directly and in high yields to the sulphuric acid esters of the corresponding 2-amino-3-halogen-anthraquinone when the nitrogen group has been completely protected by acidyl or alkyl radicals and the resulting compound suspended or dissolved in pyridine and treated with sulphur trioxide, oleum, chlorosulphonic acid or the pyridine sulphur trioxide compound obtainable by the reaction of sulphur trioxide on pyridine. The reaction is carried out in the presence of a metal, such as copper or zinc, at temperatures of from 40° to 120° C., until a test sample shows complete solubility of the reaction product in dilute caustic soda. The halogen in the 1-position is completely eliminated and the leuco-sulphuric acid ester compound which is formed can be readily oxidized to the dihalogen-dianthrahydroquinone azine tetra-sulphuric acid ester by the usual methods.

This process is suitable not only for the preparation of 3,3'-dichloro-dianthrahydroquinone azine tetra-sulphuric acid ester, but it is particularly applicable to the preparation of 3,3'-dibromo-dianthrahydroquinone azine tetra-sulphuric acid ester, which compound has not been disclosed in the prior art.

The following examples are given to more fully illustrate the invention. The parts used are by weight.

Example 1

100 parts dry, pulverized 1,3-dibromo-2-acetyl-aminoanthraquinone (obtainable by acetylating 1,3-dibromo-2-aminoanthraquinone in nitrobenzene solution with excess acetic anhydride at 140–150° C. and having a melting point of 264–266° C.) are suspended in 500 parts dry pyridine, to which 250 parts pyridine-sulphur trioxide (obtainable by reacting dry pyridine with $SO_3$) have been added. The mass is then heated to 85–90° C. at which temperature 80 parts of copper bronze are added slowly and uniformly over a period of one-half hour, while agitating at 90–95° C. The mass is stirred for two and one-half hours at 90–95° C. and then cooled to below 40° C. The reaction product may be isolated by any one of the known methods that are usually employed for the isolation of the leuco-sulphuric acid esters of the corresponding chloro-derivative; for instance, by pouring the mass into 2000 parts of a dilute soda ash solution containing 160 parts $Na_2CO_3$, stirring for one-half hour and distilling off the pyridine in vacuo. The residual mass is then further treated with 100 parts lime and 10 parts caustic soda and freed of copper salts by filtration. The filtrate may be salted with potassium carbonate, until the precipitation of the dipotassium salt of the disulphuric acid ester of 2-acetylamino-3-bromoanthrahydroquinone is complete. Alternatively, if desired, the pyridine melt may also be poured into an excess of dilute caustic soda, the pyridine may then be distilled off in vacuo, the residual mass filtered free of copper salts and the filtrate evaporated to dryness. The product is very similar in all physical properties to the corresponding known chloro-derivative, except that the alkali metal salts are somewhat less soluble in concentrated inorganic salt solutions. Caustic alkalies at 90–100° C. hydrolyze the product to the dipotassium salt of the disulphuric acid ester of 2-amino-3-bromoanthrahydroquinone, which may be crystallized from a hot 10% KOH solution in quite large yellow needles, by cooling. Acid oxidizing agents, such as nitrous acid, acid and copper sulphate or alkali metal chlorates, convert the products into 2-amino-3-bromoanthraquinone and 2-acetylamino-3-bromoanthraquinone, respectively.

Example 2

100 parts 1,3-dibromo-2-acetylaminoanthraquinone (which also may be obtained by treating the amino body in monohydrate solution with excess acetic anhydride) are suspended in 500 parts dry pure pyridine (B. P. 115–117° C.), to which 130 parts oleum (of 60% $SO_3$ content) have been added. The mass is heated to 80° C. and at this temperature 100 parts of copper powder are slowly added over a period of one-half hour. The mass is further heated to 85° C. for about one hour or until a test portion when diluted with very dilute caustic soda shows complete solubilization. The mass is then cooled and the reaction product is isolated by any one of the methods described in Example 1. The product is identical with the reaction product of Example 1.

Example 3

The reaction is carried out as described in Example 1, except that instead of 80 parts copper bronze, 50 parts copper powder, together with 50 parts zinc powder, are employed. The reaction is completed in two and one-half hours at 90–95° C. and the reaction product is found to be identical with the product of Example 1.

Example 4

100 parts of the monoacetyl derivative of 1,3-dichloro-2-aminoanthraquinone (obtainable by heating one part of the amino body in 8 parts glacial acetic acid with one part acetic anhydride for one-half hour at 120° C., and having a melting range of 254 to 257° C.) are suspended in 500 parts dry pyridine, to which 130 parts oleum (60% $SO_3$ content) have been added. The mass is heated to 80° C. and 100 parts of copper powder are added at 80° C. over a period of one-half hour, whereupon the mass is further heated to 85° C. for another two hours and then cooled. The reaction product may be isolated by any one of the methods described in Example 1. It may be further purified by recrystallization from alkaline salt solutions, and is identical with the disulphuric acid ester of 2-acetylamino-3-chloroanthrahydroquinone which has been prepared from 2-acetylamino-3-chloroanthraquinone.

Example 5

100 parts 1,3-dichloro-2-aminoanthraquinone are acetylated with 500 parts acetic anhydride for one hour at 140° C., or by heating the amino body in nitrobenzene solution with a large excess of acetic anhydride and a trace of sulphuric acid monohydrate for one hour at 150–160° C. The product thus obtained has a melting point range of 194° to 195° C. and is believed to be the diacetyl derivative of 1,3-dichloro-2-aminoanthraquinone. 100 parts of this compound are suspended in 500 parts dry pyridine and 80 parts $SO_3$ are distilled into the cooled mass (below 40° C.) under agitation. The mass is then heated to 80° C. and at this temperature 100 parts of copper powder are added over a period of one-half hour. After heating for another hour at 80–85° C. the mass is cooled and poured into 2000 parts diluted potassium hydroxide solution, containing enough KOH to render the final mass distinctly alkaline. The pyridine is now removed by a vacuum distillation and the residual mass is freed from copper salts by filtration. The filtrate is heated with a large excess of caustic potash (10% solution of KOH) for one hour at 90° C., in order to hydrolyze the acetyl body to the free amino base. Upon cooling, the dipotassium salt of the disulphuric acid ester of 2-amino-3-chloroanthrahydroquinone crystallizes out of solution in the form of yellowish needles, suitable for the conversion into the tetra-sulphuric acid ester of leuco-3,3′-dichloro-indanthrone by known oxidation methods.

Example 6

100 parts 1-bromo-2-acetylamino-3-chloroanthraquinone (obtainable by heating the corresponding amino base in nitrobenzene solution with excess acetic anhydride) are suspended in 500 parts dry pyridine, to which 130 parts oleum (62% $SO_3$ content) have been added. The mass is then heated to 80° C. and 100 parts of copper powder are then added over a period of one hour at 80° C. The mass is further stirred at 80° C. for fifteen minutes and then cooled to 60° C. and poured into 10,000 parts ice and water containing 500 parts soda ash. After stirring for fifteen minutes the clear water layer is drawn off and the precipitated pyridine copper complex is then further treated with 1000 parts of a 10% caustic soda solution. The mass is then distilled free of pyridine and filtered. The reaction product, which is identical with the product of the previous example may be isolated from the filtrate as the dipotassium salt, by the addition of a large amount of potassium carbonate. The yield is practically quantitative.

Example 7

115 parts 1,3-dibromo-2-benzoylaminoanthraquinone (obtainable by benzoylating 1,3-dibromo-2-aminoanthraquinone in nitrobenzene with excess benzoyl chloride) are suspended in 1000 parts dry pyridine to which 260 parts oleum (60%) have been added. The mass is heated to 75° C. and 25 parts copper powder are then added, whereupon the mass becomes quite thick and the temperature rises to about 80° C. An additional 75 parts of copper powder are added and the mass is stirred at 80° C. for twenty-five minutes, whereupon the mass becomes quite thin and the reaction product appears to be in solution. At this point the mass is cooled to 50° C. and poured into 10,000 parts of a 6% soda ash solution. After stirring for fifteen minutes and settling for one-half hour, the clear water layer is decanted off and the residue is stirred for fifteen minutes with 1000 parts of a 10% potassium hydroxide solution. 25 parts of sodium bicarbonate are added and the pyridine is distilled off under high vacuum. The residual mass is diluted to a total volume of 1650 parts with water and filtered at 50° C. Upon cooling the filtrate to room temperature, the reaction product precipitates out of solution and the precipitation may be completed by the addition of 80 parts potassium carbonate (bringing the $K_2CO_3$ concentration to 5%). The reaction product, which may be filtered off and dried, is the dipotassium salt of the disulphuric acid ester of 2-benzoylamino-3-bromoanthrahydroquinone, which is much less soluble in salt solution than the corresponding acetyl derivative. Acid oxidizing agents convert the product into 2-benzoylamino-3-bromoanthraquinone of a melting point range of 258–260° C. 10% caustic solutions hydrolyze the benzoyl compound on heating for one hour to 90° C., giving the leuco-sulphuric acid ester of the free amino body in the form of its alkali metal salt.

Example 8

40 parts 1,3-dibromo-2-acetyl-N-monomethylanthraquinone (having a melting point of 203–205° C. and obtained by acetylating 1,3-dibromo - 2-N-monomethylaminoanthraquinone, which in turn was obtained by reacting the amino body with formaldehyde in concentrated sulphuric acid or oleum, as described in the co-pending application No. 37,329 by J. Deinet, in 500 parts of a mixture of equal parts glacial acetic acid and acetic anhydride) are suspended in 300 parts dry pyridine, to which 60 parts oleum (65% SO₃ content) have been added. The mass is heated to 80° C. and 40 parts copper powder are added at 80–85° C. The mass is then further stirred for two hours at 80–85° C. and poured into 5000 parts of ice and water containing 75 parts soda ash. After stirring for twenty minutes, the precipitate is allowed to settle, the clear water layer is siphoned off and the residue is treated with 500 parts of a 10% caustic soda solution. The pyridine is then removed by a vacuum steam distillation and the residual mass is filtered free of copper salts. The filtrate is salted with enough potassium carbonate to obtain a 20% $K_2CO_3$ solution and the precipitated reaction product is filtered off and hydrolyzed in a solution of 10% KOH for one hour at 90° C. Upon cooling, the reaction product is obtained in yellowish needles. The product is the dipotassium salt of the disulphuric acid ester of 2-N-monomethylamino-3-bromoanthrahydroquinone which upon treatment with acid oxidizing agents, such as nitrous acid, is converted into 2-N-monomethylamino-3-bromoanthraquinone.

Example 9

30 parts of 1,3-dibromo-2-N-dimethylaminoanthraquinone (obtainable by dimethylating 1,3-dibromo-2-aminoanthraquinone in sulphuric acid solution with methyl alcohol, as described in German Patent 288,825) are solubilized by the method described in the previous example, using 200 parts dry pyridine, 40 parts oleum (65%), 30 parts copper powder and the corresponding amounts of soda ash, caustic soda and potassium carbonate. The product is isolated in the same manner and is the dipotassium salt of the disulphuric acid ester of 2-N-dimethylamino-3-bromoanthrahydroquinone.

All the reaction products of the above examples, with the exception of the dimethylamino body obtained in Example 9 may be oxidized, after hydrolysis to the free amino bases, in alkaline solutions with strong oxidizing agents, such as lead peroxide, alkali metal, hypochlorite, potassium ferricyanide or electrolytically, by the methods described in literature, for the preparation of the leuco-tetra-sulphuric acid ester of 3,3′-dichloroindanthrone from the 2-amino-3-chloroanthrahydroquinone-disulphuric acid ester, as further illustrated by the following examples.

Example 10

An amount of the potassium salt of 2-amino-3-bromoanthrahydroquinone-disulphuric acid ester (as obtained in Examples 1, 2, 3, or 6) equivalent to 44 parts of (regenerated) 2-amino-3-bromoanthraquinone is dissolved at 90° C. in 900 parts of a 10% KOH solution, and there are then added under agitation 75 parts lead peroxide ($PbO_2$) and the mass is stirred for one hour at 90° C. The mass is then filtered at 90° C. and to the filtrate are added 50 parts potassium hydroxide. Upon cooling, the reaction product crystallizes out of solution. It is the tetra-potassium salt of the tetra-sulphuric acid ester of 3,3′-dibromodianthrahydroquinone azine of the probable formula

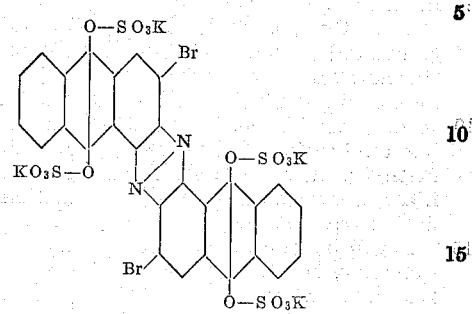

The product may be further purified by redissolving 100 parts of the dry product in 1000 parts water and precipitating by adding at 70–80° C. 50 parts KOH and 500 parts methyl alcohol. Upon cooling the solubilized indanthrone dyestuff is obtained in golden-yellow colored crystals, which resemble in general physical and chemical properties the corresponding chloro-derivative, when the latter is purified in an analogous manner. The product can be printed, dyed, and padded by the same methods as are commonly employed for the corresponding chloro-derivative. It yields shades of equal brightness, but somewhat more greenish-blue in tone in comparison with the shades obtained from the tetra-sulphuric acid ester of leuco-3,3′-dichloroindanthrone. Acids convert the yellow product into the disulphuric acid ester, which is of a purple color, sparingly soluble in water. Acid oxidizing agents convert the product into 3,3′-dibromoindanthrone of very high purity.

Example 11

25 parts of the disoda salt of 2-acetylamino-3-bromoanthrahydroquinone-disulphuric acid ester (as obtained by pouring the pyridine melt into dilute caustic soda according to one of the alternative methods described in Example 1) are dissolved in 250 parts dilute caustic soda solution containing 20 parts NaOH. The solution is boiled for one-half hour in order to hydrolyze the acetyl group and 0.5 part potassium ferricyanide is then added. The solution is then cooled to 60–65° C. and while agitating at this temperature an electric current is allowed to pass through the solution, using iron electrodes and maintaining a potential of 6 volts and a current of 2.7 and 2.8 amperes. The oxidation is continued for about three hours or until a test portion shows the reaction mass to be free of unchanged 2-amino-3-bromoanthraquinone body. The solution is then filtered at 65° C. and to the filtrate are added, at 70–80° C., 65 parts potassium hydroxide and 80 parts methyl alcohol. Upon cooling, the reaction product crystallizes out of solution in golden-yellow crystals, which are identical to the purified reaction product of the previous example.

Example 12

10 parts of the dipotassium salt of 2-N-monomethylamino - 3 - bromoanthrahydroquinone-disulphuric acid ester (as obtained in Example 8) are heated at 90° C. in a 10% solution of KOH, to which 10 parts lead peroxide have been added. After heating for fifteen minutes the mass is filtered. The filtrate is a solution of the potassium salt of the tetra-sulphuric acid ester of deuco-3,3'-dibromo-N-dimethyl-indanthrone together with some impurities. It dyes cotton in the same yellowish shades as the corresponding leuco-sulphuric acid esters of the 3,3'-dibromo-indanthrone. Acid oxidizing agents in the cold convert this yellow dye to the blue indanthrone compound which is identical with the indanthrone dyestuff obtained from 1,3-dibromo-2-N-monomethylaminoanthraquinone obtained according to the method described in the copending application No. 37,329 by J. Deinet. The methyl groups therefore remain attached to the nitrogen atoms during the solubilization and oxidation treatment.

It will be well understood that many modifications may be employed in my novel solubilization reaction. Thus the amounts of solvent (pyridine) used may be varied over very wide limits, as long as enough solvent is used to render the mass stirrable. It has also been found that the temperature at which the reaction is carried out may be varied to some extent, provided that on the one hand the temperature is high enough to permit the reaction to be completed within a reasonable time, and on the other hand not high enough to attack the halogen in the 3-position. The preferred temperature limits, thus defined, are usually between 40 and 120° C. Wider limits may be permissible, depending upon the nature of the compound to be solubilized. In general, it has been found that more stringent conditions, such as higher temperatures or longer reaction time may be safely employed, when working with 3-chloro-2-aminoanthraquinone bodies, whereas the corresponding bromo-derivatives tend to lose some of the halogen, even in the 3-positions, when the temperature is raised above 100° C. and the heating is continued for more than one to two hours.

The order of charging the components into the reaction vessel may be further modified, for instance, by charging an intimate mixture of the dry, pulverized 1,3-dihalogen-2-N-substituted aminoanthraquinones with copper powder into the pyridine melt at the reaction temperature.

Other N-substituents than those mentioned by which the amino group is protected and which subsequently may be removed prior to the oxidation of the indanthrone color may be employed, as will be readily understood by those skilled in the art.

Instead of using the ketonic anthraquinone bodies as starting materials, the isolated dry leuco derivatives (obtainable, for instance, from the alkaline hydrosulphite vats by known procedures or by catalytic hydrogenation, according to the method described in U. S. Patent 1,829,840) may be employed, but metals must be used in the solubilization according to this invention, to effect the replacement of the alpha halogen by hydrogen.

1,3-dichloro-2-acetyl-N-monomethylaminoanthraquinone may also be solubilized and converted to the leuco-sulphuric acid ester of 3,3'-dichloro-N-dimethyl-indanthrone in the same manner as the 1,3-dibromo compound described in Examples 8 and 12.

I claim:

1. In the process for preparing leuco-disulphuric acid esters of 2-amino-3-halogen-anthraquinones, the steps which comprise reacting a 1,3-dihalogen-2-aminoanthraquinone in which the amine group is protected by substituents of the class consisting of alkyl and acidyl groups, in a tertiary organic base, with a compound of the class consisting of sulphur trioxide, oleum, chlorosulphonic acid, and the pyridine sulphur trioxide compound obtainable by reacting sulphur trioxide with pyridine, in the presence of a metal of the class consisting of copper and zinc, at temperatures not materially above 120° C.

2. In the process for preparing leuco-disulphuric acid esters of 2-amino-3-halogen-anthraquinones, the steps which comprise reacting a 1,3-dihalogen-2-aminoanthraquinone in which the amine group is protected by substituents of the class consisting of alkyl and acidyl groups, in pyridine, with a compound of the class consisting of sulphur trioxide, oleum, chlorosulphonic acid and the pyridine sulphur trioxide compound obtainable by reacting sulphur trioxide with pyridine, in the presence of copper, at a temperature of from about 40 to 120° C.

3. In the process for preparing leuco-disulphuric acid esters of 2-amino-3-bromoanthraquinones, the steps which comprise heating 1,3-dibromo-2-aminoanthraquinone, in which the amine group is protected by substituents of the class consisting of alkyl and acidyl groups, in pyridine with a sulphonating agent of the class consisting of sulphur trioxide, oleum, chlorosulphonic acid and the pyridine sulphur trioxide compound obtainable by reacting sulphur trioxide and pyridine, in the presence of copper, at a temperature of about 100° C., until solubilization is complete.

4. In the process for preparing leuco-disulphuric acid esters of 2-amino-3-halogen-anthraquinones, the step which comprises heating a 1,3-dihalogen-2-acetylaminoanthraquinone in pyridine with a sulphur trioxide pyridine compound and in the presence of copper, at a temperature of from 40 to 120° C., until esterification is completed.

5. In the process for preparing leuco-disulphuric acid esters of 2-amino-3-halogen-anthraquinones, the steps which comprise heating a 1,3-dihalogen-2-acetylaminoanthraquinone in pyridine with a sulphur trioxide pyridine compound and in the presence of copper, at a temperature of from 40 to 120° C., until esterification is completed, isolating the 2-acetylamino-3-halogen-leuco-anthraquinonedisulphuric acid ester as the dialkali metal salt, and hydrolyzing the product to give the dialkali metal salt of 2-amino-3-halogen-leuco-anthraquinonedisulphuric acid ester.

6. In the process for preparing leuco-disulphuric acid esters of 2-amino-3-bromoanthraquinones, the step which comprises heating a 1,3-dibromo-2-acetylaminoanthraquinone in pyridine with a sulphur trioxide pyridine compound and in the presence of copper, at a temperature of from 40 to 120° C., until esterification is completed.

7. In the process for preparing leuco-disulphuric acid esters of 2-amino-3-bromo-anthraquinones, the steps which comprise heating a 1,3-dibromo-2-acetylaminoanthraquinone in pyridine with a sulphur trioxide pyridine compound and in the presence of copper, at a temperature of from 40 to 120° C., until esterification is completed, isolating the 2-acetylamino-3-bromo-leuco-anthraquinonedisulphuric acid ester as the dialkali metal salt, and hydrolyzing the product to give the dialkali metal salt of 2-amino-3-bromo-leuco-anthraquinonedisulphuric acid ester.

OTTO STALLMANN.